United States Patent [19]

Austin

[11] 4,236,913

[45] Dec. 2, 1980

[54] GASEOUS ATMOSPHERE FOR ELECTRIC ARC FURNACES

[76] Inventor: Ivy C. Austin, 34184 Ecorse Rd., Romulus, Mich. 48174

[21] Appl. No.: 47,347

[22] Filed: Jun. 11, 1979

[51] Int. Cl.$^3$ ............................................... C21C 5/52
[52] U.S. Cl. ...................................... 75/10 R; 75/12; 75/59
[58] Field of Search ...................................... 75/10–12, 75/49, 59

[56] References Cited

U.S. PATENT DOCUMENTS

| | | | |
|---|---|---|---|
| 3,736,361 | 5/1973 | Lakomsky | 75/10 R |
| 3,771,585 | 11/1973 | Ulrich | 75/10 R |
| 4,148,628 | 4/1979 | Fukunishi | 75/10 R |

OTHER PUBLICATIONS

Paschkis & Persson, "Industrial Electric Furnaces & Appliances", 2nd Ed., pp. 311-314, (Interscience, 1960).

*Primary Examiner*—P. D. Rosenberg
*Attorney, Agent, or Firm*—Basile, Weintraub & Hanlon

[57] ABSTRACT

An inert atmosphere for electric arc furnaces is either carbon dioxide, argon, a mixture of carbon dioxide and argon or a mixture of nitrogen and carbon dioxide. The inert gas atmosphere is utilized in the manufacture of high alloy or stainless steels, as well as in the manufacture of copper.

9 Claims, No Drawings

GASEOUS ATMOSPHERE FOR ELECTRIC ARC FURNACES

BACKGROUND OF THE INVENTION

I. Field of the Invention

The present invention pertains to electric arc furnaces. More particularly, the present invention concerns gaseous atmospheres for electric arc furnaces. Even more particularly, the present invention concerns inert atmospheres for electric arc furnaces.

II. Prior Art

The manufacture of steel and alloys thereof, such as stainless steel, is well documented. There are a plurality of methods used to prepare iron and alloys thereof, such as steel, stainless steel as well as esoteric iron alloys. Steel, differs from pig iron and other forms of iron which are ordinarily manufactured, by a reduced carbon content. As is known to those skilled in the art to which the present invention pertains there are a plurality of methods currently known for the manufacture of steel. One such method is the open hearth method wherein pig iron, along with a certain amount of scrap iron, is deposited in a furnace hearth wherein a gas and air mixture is burned over the iron. The gas burned in the furnace generates a waste gas which are discharged up a chimney flue. However, before being discharged gases give off a considerable proportion of their heat to brick-lined heating chambers. The chambers, which are formed of refractory bricks, are, thus, heated to red hot temperatures. After the bricks reach the elevated temperature the gas flow is reversed and the mixture of gas and air is admitted through the heating chambers from which it absorbs heat. This preheating of the gas and air enables the combustion temperature of the flame to be considerably raised. The burning of the gas and air mixture above the pig iron causes an oxidation reaction to produce the steel.

Another method of steel manufacture is the Bessemer process. Yet another method is the oxygen steel-making process. Another form of steel manufacture, wherein mild steels of exceptionally high purity are manufactured, is the electric process. According to this process there is no air employed. In steel making with electric arc furnaces the requisite heat for the refining of the steel (sometimes pig iron) is supplied, not by the burning of gas or coal, but by an electric current. The heat is produced by an electric arc which is formed between a number of carbon electrodes and the surface of the molten bath. Rather than employing a combustive air for oxidizing the undesirable admixtures in the furnace, iron oxides are added, which give off their oxygen. In carrying out an electric arc steel manufacturing process an inert atmosphere is employed within the furnace.

The electric arc furnace operates on the principle of electric arc discharge. Ordinarily, this is allied to a gas discharge which takes place when electricity is passed through rearified gases. The arc discharge occurs when two carbon electrodes are brought into contact with each other and are then moved apart. Ordinarily, just before the carbon rods separate and direct material contact between them is broken, a high electric resistance is developed to the extent that the tips of the carbon electrodes begin to glow. This is associated with the emission of electrons which, because of the high emission temperatures, produces a high degree of ionization of the air. As a result of this ionization, the air in the immediate vicinity of the carbon tips becomes conductive to electricity, so that the current will continue to flow when the electrodes are no longer actually touching each other. The bombardment of electrons to which it is exposed causes the positive elctrode, in particular, to become white hot and a crater forms at its tip. In the actual arc itself, the gas molecules of the air dissociate. In electric furnaces, per se, the intense heat developed by the arc discharges utilized for the melting of metals. If the material to be melted is a poor conductor of electricity, the heat radiated by the arc formed between two carbon electrodes is used to melt it. On the other hand, if the material does conduct electricity, then the arc discharger may either be passed directly from the electrodes to the material or the electrodes may actually be buried in the material. In either case though, the considerable heat developed in the electrodes helps the current to generate heat in the material and thus attain the melting temperature. In the manufacture of steel, however, because it is a good conductor of electricity, the electrodes are placed above the material, i.e., the pig iron or steel.

Ordinarily, an inert atmosphere of nitrogen is employed in electric arc furnaces. By utilizing an atmosphere of rarified gas, having a higher heat retention content, it is reasoned that a longer electrode life with a decrease of energy input as well as a resulting higher quality molten metal and faster melt down time can be achieved. The present invention, as will subsequently be detailed, seeks to provide to improve inert atmospheres for conducting electric arc furnace manufacture of steel.

SUMMARY OF THE INVENTION

In accordance with the present invention an inert atmosphere for utilization in an electric arc furnace for the manufacture of copper or steel is selected from the group consisting of carbon dioxide, argon, carbon dioxide and argon or a mixture of nitrogen and carbon dioxide.

Where the mixture of carbon dioxide and argon is employed, the carbon dioxide is present in an amount ranging from about ten to about ninety percent, by volume, and the argon is present in an amount ranging from about ninety percent to about ten percent, by volume. Likewise, where the mixture of nitrogen and carbon dioxide is employed, the amount ranges from about ten to about ninety percent of nitrogen, by volume, and the carbon dioxide is present, in an amount, ranging from about ninety to about ten percent, by volume. Preferably, where a mixture of gases is employed each of the gases is present in a one to one volumetric ratio.

Where carbon dioxide is employed as the inert atmosphere, the gaseous carbon dioxide is admitted to the furnace to purge it of any other gases. After the furnace has been purged, this arc between the electrodes is increased as the current rises. The carbon dioxide atmosphere is maintained throughout the melt down process. The amount of gaseous carbon dioxide introduced is equal to that lost from leakage in the furnace.

The other gaseous systems are employed in precisely the same manner.

For a more complete understanding of the present invention reference is made to the following detailed description.

DESCRIPTION OF THE PREFERRED EMBODIMENTS

In accordance with the present invention, electric arc furnaces for the manufacture of copper, steel and other iron alloys, employ an inert atmosphere therewithin selected from the group consisting of carbon dioxide, argon, a mixture of carbon dioxide and argon or a mixture of nitrogen and carbon dioxide. Each of the atmospheres can be utilized in the electric arc furnace with equal efficacy. Each of the atmospheres employed herein has a higher quality heat content, expressed in calories or BTU's than a conventional nitrogen atmosphere. Furthermore, each of the atmospheres has a less oxygen content than would ordinarily be present in a commercially available nitrogen atmosphere. The consequence of these two factors results in a longer electrode life, a decrease in the energy input prerequisite to maintain the temperatures within the furnace. Because of the reduced oxygen present there is a higher quality in the molten metal as well as a faster meltdown time.

For example, the normal heat content of a nitrogen atmosphere is expressed as $Cp = 6.5 + 0.001\ T°K.$, as calories per degree (K.) per mole. On the other hand, a carbon dioxide system evidences a specific content of $10.34 + 0.001\ T6°K$. An argon system evidences a specific heat of 4.97 calories per degree (°K.) per mole. The carbon dioxide and argon system, of course, is determined on a percentage molar basis, and varies depending on the volumetric ratios of the gases employed. The nitrogen and carbon dioxide system also, evidences a higher heat value than normal nitrogen atmospheres. Generally, the specific heat value of the nitrogen and carbon dioxide system will vary according to the molar proportion employed.

Where carbon dioxide and argon, alone, comprise the atmosphere in which the electric arc furnace steel making process is conducted, the atmosphere is substantially one hundred percent of the pure gas.

Where the atmosphere consists essentially of carbon dioxide and argon, each of the elements is present, in a percentage ranging from about ten to about ninety percent, by volume. Preferably, the carbon dioxide is present in an amount ranging from about twenty-five to about fifty percent, by volume, and the argon is present in an amount ranging from about fifty to about seventy-five percent, by volume.

Where nitrogen and carbon dioxide is present, the nitrogen is present in an amount ranging from about ten to about ninety percent, by volume and the carbon dioxide is present in an amount ranging from about ten to about ninety percent, by volume. Preferably, the nitrogen and carbon dioxide are each present in an amount of about fifty percent, by volume.

In deploying each of the atmospheres, the same procedure is employed. Generally speaking the furnace is purged of any residual gases by the introduction thereinto of the selected gaseous atmosphere. The furnace is purged by flowing the selected atmosphere therethrough. Then, when the atmosphere comprises 100 percent of the selected inert gas in accordance herewith, the electrodes are brought into contact, and an electric current is then caused to flow to the electrodes. At the preselected current, the electrodes are then gradually moved apart.

As the electrodes are moved apart an arc is generated between the electrodes. Because of the conduction of the molten metal an arc is generated therebetween as well as to effectuate the further melting thereof to cause the refinement of the low grade steel.

As the melting process and refining process continues on, the atmosphere of the inert gas is maintained by the flow therewithin through any conventional means. The amount of atmosphere introduced into the furnace is equal to the amount which is lost through a leakage or the like.

As indicated hereinabove, because of the purity as well as the heat content of the atmosphere hereof, there is a longer electrode life and a faster meltdown time. Also, as a consequence hereof there is a decrease in the energy input necessary to maintain the heat values within the atmosphere as well as a higher quality molten metal.

It should be noted that the pure form of the gases, i.e. a one hundred percent argon atmosphere produces a higher grade of purity in the steel, as opposed to a gaseous mixture of argon and carbon dioxide. In order, the highest purity is derived from an argon atmosphere, followed by the argon-carbon dioxide atmosphere; next, the nitrogen and carbon dioxide atmosphere and finally the carbon dioxide atmosphere. Yet, everyone of these atmospheres produces a higher quality metal than a one hundred percent nitrogen atmosphere.

Having, thus, described the invention what is claimed is:

1. In a process for the manufacture of steel or copper in an electric arc furnace wherein either molten steel and other iron alloys or copper is refined by the generation of heat produced by an electric arc formed between a plurality of electrodes and the surface of the molten metal, the process being conducted in an inert atmosphere, the improvement which comprises:
   refining the molten metal in an inert atmosphere selected from the group consisting of carbon dioxide, argon, a mixture of carbon dioxide and argon, a mixture of nitrogen and carbon dioxide and mixtures thereof.

2. The improvement of claim 1 wherein:
the atmosphere is argon.

3. The improvement of claim 1 wherein:
the atmosphere is carbon dioxide.

4. The improvement of claim 1 wherein:
the atmosphere is the mixture of carbon dioxide and argon.

5. The improvement of claim 4 wherein:
the carbon dioxide and argon are present, respectively, in an amount ranging from about ten to about ninety percent, by volume of carbon dioxide and from about ninety to about ten percent, by volume of carbon dioxide.

6. The improvement of claim 5 wherein:
the carbon dioxide is present in an amount ranging from about ten to about twenty-five percent, by volume, and the argon is present in an amount ranging from about seventy-five percent to about ninety percent, by volume.

7. The improvement of claim 1 wherein:
the atmosphere is the mixture of nitrogen and carbon dioxide.

8. The improvement of claim 7 wherein:
the nitrogen and carbon dioxide are present, respectively, in an amount ranging from about ten to about ninety percent, by volume of nitrogen and from about ninety percent to about ten percent, by volume, of carbon dioxide.

9. The improvement of claim 8 wherein:
the nitrogen and carbon dioxide are each in an amount of about fifty percent, by volume.

* * * * *